United States Patent [19]

Skelly et al.

[11] 3,787,338

[45] Jan. 22, 1974

[54] AQUEOUS DISPERSIONS OF FINELY DIVIDED LUBRICANTS IN POLYAMIDE ACID

[75] Inventors: David W. Skelly, Burnt Hills; Bernard C. Wagner, Schenectady, both of N.Y.

[73] Assignee: General Electric Company, Schenectady, N.Y.

[22] Filed: Feb. 25, 1972

[21] Appl. No.: 229,591

[52] U.S. Cl. ........ 260/29.2 N, 204/181, 260/29.6 F
[51] Int. Cl. ..... C08g 51/24, C08j 1/48, C23b 13/00
[58] Field of Search................ 260/29.2 N; 204/181

[56] References Cited
UNITED STATES PATENTS

| | | | |
|---|---|---|---|
| 3,434,942 | 3/1969 | Waterman | 204/181 |
| 3,582,481 | 6/1971 | Hovey et al. | 204/181 |
| 3,687,824 | 8/1972 | Brown et al. | 204/181 |
| 3,179,631 | 4/1965 | Endrey | 260/29.2 N |
| 3,448,068 | 6/1969 | Holub et al. | 260/29.2 N |
| 3,366,563 | 1/1968 | Hart et al. | 260/29.2 N |
| 3,541,036 | 11/1970 | Libackyj | 260/29.2 N |

*Primary Examiner*—Murray Tillman
*Assistant Examiner*—A. H. Koeckert
*Attorney, Agent, or Firm*—John F. Ahern et al.

[57] ABSTRACT

Substantially uniform aqueous dispersions are provided of a finely divided solid, such as a pigment or a lubricant, for example, polytetrafluoroethylene particles, in a polyamide acid. These aqueous polyamide acid dispersions can be employed to make polyimide-metal composites exhibting improved lubricity.

1 Claim, No Drawings

AQUEOUS DISPERSIONS OF FINELY DIVIDED LUBRICANTS IN POLYAMIDE ACID

The present invention relates to aqueous polyamide acid dispersions containing finely divided lubricant particles and a method for making composites using such dispersions.

Prior to the present invention, polyamide acid solutions such as shown by Holub et al. U.S. Pat. No. 3,448,068, assigned to the same assignee as the present invention were readily applied to various substrates, such as electroconducting substrates when such polyamide acids were electrocoated onto the substrate surface. Valuable polyimide films are formed when the electrodeposited polyamide acid is heated and converted to the polyimide state. Such polyimide films have been found to exhibit valuable insulating characteristics and temperature stability. In particular applications, such as computer discs, non-stick properties as well as toughness is required. The lubricity of such films and wear performance over extended periods of time often limit their potential usefulness.

The present invention is based on the discovery that several lubricants, such as polytetrafluoroethylene, molybdenum disulfide, and graphite can be added when in the finely divided state, such as colloidal, to aqueous phenolic solutions of polyamide acid to produce substantially uniform aqueous electrocoatable dispersions of such solid lubricant in such polyamide acid. The term "electrocoating" is intended to cover a process whereby organic coatings are formed on electrically conducting surfaces by the action of a DC current. In particular instances dispersing agents, such as tannic acid or surfactants, or mechanical stirring or vibration can be employed to stabilize the aqueous dispersions of finely divided lubricants in polyamide acid during the electrocoating process.

The substantially uniform dispersions of finely divided solids in aqueous polyamide solutions comprise by weight, A. from 0.1 to 13% of polyamide acid
B. at least .05% of finely divided solid, and
C. the balance solvent, where (B) is a member selected from a pigment, and a lubricant, and a mixture thereof, (C) comprises water and phenol, and (A) is the product of reaction of at least one dianhydride selected from the class consisting of benzophenone dianhydride and a dianhydride selected from,

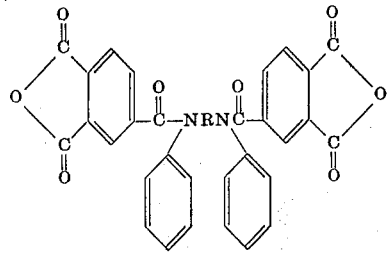

and

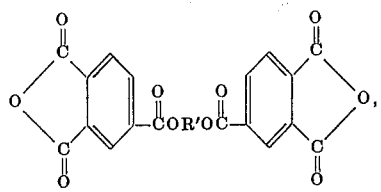

and at least one diamine selected from the class consisting of $C_{2-8}$ alkylene diamine, m-phenylene diamine and diamines having the formula,

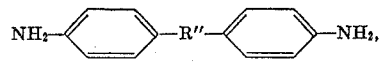

where R is a divalent hydrocarbon radical, R' is an alkylene radical, and R'' is selected from $C_{1-3}$ alkylene,

and O.

The finely divided solid lubricants which can be employed in the practice of the invention are for example, colloidal graphite, such as Dag dispersion, covering a 35 percent dispersion of graphite in water manufactured by Acheson Colloids Company of Port Huron, Michigan, dispersions of molybdenum disulfide also are included. Further examples are Dupont 30, a Teflon dispersion of polytetrafluoroethylene at 60 percent solids in water. In addition to the aforementioned lubricants, reinforcing material such as colloidal silica having about 25 percent silica solids in water can be used. Combinations of the aforementioned finely divided solids can also be employed with dispersable pigments, such as copper phthalocyanine (blue).

In preparing the polyamide acid, it has been found preferable to add the dianhydride to the diamine dissolved in the phenol-water mixture and allow the mixture to remain at ambient temperatures with stirring, employing cooling if necessary to maintain the temperature of the mixture below 40° C.

Among the various diamines which can be employed in combination with the above-described dianhydrides are the various alkylene diamines, such as those containing from two–eight carbon atoms, for example methylene diamine, propylene diamine, butylene diamine, 2-methyl propylene diamine, 1,2-diamino butane, pentamethylene diamine, hexamethylene diamine, heptamethylene diamine, octamethylene diamine, etc. In addition, diamino benzenes can be employed, such as metaphenylene diamine, as well as diamines in the form of isomeric para-oxydianilines, such as 2,2'-oxydianiline, 3,3'-oxydianiline, 4,4'-oxydianiline, 2,3'-oxydianiline, 2,4'-oxydianiline, etc. Alkylene dianilines having alkylene groups from one to three carbon atoms, such as methylene dianiline, ethylidine dianiline, ethylene dianiline, propylidene dianiline, as well as the various ortho, meta and para isomers of diamino benzophenone and the various ortho, meta and para isomers of sulfonyl dianiline. Preferably, metaphenylene diamine, tetramethylene diamine, hexamethylene diamine, 4,4'-oxy-dianiline, 4,4'-methylene dianiline, and 4,4'-sulfonyl dianiline can be employed.

Of the various dianhydrides which can be utilized to make the polyamide acid, 3,3',4,4'-benzophenone tetracarboxylic acid dianhydride is preferred.

In the polyamide acid solutions which can be used in the practice of the invention, where the solvent consists solely of phenol and water, the weight proportions of water in the phenol-water solvent can vary from 12 percent to as high as 85 percent of water. To facilitate the formation of the polyamide acid solution, ammonia or ammonia salts of organic monocarboxylic acids, such as ammonium formate, ammonium acetate, etc. can be utilized.

In preparing the aqueous dispersions employed in the practice of the present invention, the finely divided pigment or lubricant can be added to the aqueous polyamide acid solution with stirring. Undue precipitation of the finely divided solid in the resulting mixture is to be avoided if possible. Experience has shown that a high degree of dilution with water, along with inert solvents, such as ethylene glycol will tend to reduce the tendency of the finely divided dispersed polytetrafluoroethylene from precipitating from the mixture. In particular instances, certain lubricants, such as finely molybdenum disulfide can be employed in the polyamide acid solution in combination with stabilizing agents, such as tannic acid. It has been found that in the event that precipitation of the finely divided solid occurs, separation of the precipitated particles can be readily achieved with standard means, such as filtration, or by centrifuging. In addition to utilizing dilution with water and inert solvents, such as ethylene glycol, the mixture can also be modified by the adjustment of pH utilizing standard bases, such as ammonia.

In addition to ethylene glycol other inert organic solvents, such as N-methylpyrrolidone, ethanolamine, isopropyl alcohol, ethanol can be employed. Substrates which can serve as the anode during an electrocoating process, can consist of such metals as titanium, nickel, nickel-phosphorous alloy, stainless steel, and aluminum.

Unless otherwise indicated, the electrocoating procedure used in the following examples employed an Electromodel DG12T filtered DC power supply, which could be adjusted for constant current or constant voltage.

In order that those skilled in the art will be better able to practice the invention, the following examples are given by way of illustration and not by way of limitation. All parts are by weight.

EXAMPLE 1

There was added about 30 parts of an aqueous dispersion of polytetrafluoroethylene, containing about 10% by weight of dispersed solids to about 100 parts of a polyamide acid solution. The polyamide acid solution consisted of about 10% polyamide acid solids, about 20% phenol, and about 70% by weight of water, which was adjusted to a pH of about 7.8 with ammonia. The polyamide acid was prpared by effecting reaction between 2.16 parts of m-phenylene diamine and 6.44 parts of 3,3',4,4'-benzophenone tetracarboxylic acid dianhydride. The dianhydride was added with stirring to the m-phenylene diamine while dissolved in 34 parts of the mixture consisting of 80% phenol and 20% water. An exothermic reaction occured, which was maintained below 40° C with external cooling.

The above aqueous dispersion of polytetrafluoroethylene in the polyamide acid was then employed with a titanium substrate as the anode in an electrocoating procedure to produce composites of electrodeposited polyamide acid, having polytetrafluoroethylene finely dispersed therein, on the surface of a titanium substrate. Electrodeposition was effected using a current of 80 ma for 1 minute in a stainlss steel beaker which served as the cathode. A polyamide acid-titanium composite was also made using the same titanium substrate and the above described polyamide acid free of polytetrafluoroethylene. For purposes of comparing wear resistance of the resulting cured polyimide film, titanium washers were employed for use in a Roxana friction tester. Cure of the electro-deposited polyamide acid was achieved after an air dry at 100° C for 1 minute and a 2 ½ minute cure at 250° C.

The titanium washers having cured polyimide film at about 0.25 mil were then tested for lubricity and wear resistance. The Roxana friction tester was employed at room temperature. A bare A-55 titanium rider rotating at 1 rpm was employed over the stationery imidized titanium washers. The force on the rider could be increased from 55/psi. The friction test was performed over a period of about 120 minutes, utilizing a load between 55–110/psi. In one instance, the load was increased to 165/psi and run for 210 minutes. It was found that the friction coefficint for the washer having the polyimide film derived from the aqueous dispersion had a friction coefficient of about 0.7 to 0.8. The polyimide film free of finely divided polytetrafluoroethylene was found to have friction coefficient of 0.16 to 0.20 after 60 minutes, utilizing a load of about 55–110/psi. A break down occured after 20 minutes.

EXAMPLE 2

There was added 69 parts of a molybdenum disulfide dispersion in water at about 35% solids to about 100 parts of the polyamide acid solution of Example 1. To the resulting mixture, there was added one part of tannic acid dissolved in five parts of water to assist in the dispersion of the molybdenum disulfide. The pH of the resulting mixture was adjustd with a 10% aqueous ammonia solution to 7.8. Utilizing the electrocoating procedure of Example 1, aqueous polyamide acid dispersion was electrodeposited onto the titanium washer employing a constant current over the range of 20 milliamps for 10 seconds. Another sample was run for 15 seconds utilizing a current of 40 milliamps. During the electrodeposition, the mixture was agitated. A friction test was run over a period of 85 minutes using a load of 55/psi. It was found that valuable lubricity was imparted to the surface of the titanium washer as the result of the electrodeposition and cure of the aqueous dispersion in accordance with the procedure of Example 1.

EXAMPLE 3

There was added 50 parts of a colloidal aqueous dispersion of graphite having about 22% solids into about 200 parts of the polyamide acid solution of Example 1. The resulting aqueous dispersion was then ball milled for 2 ½ hours. The resulting mixture was then mixed with equal parts by weight of water. There was obtained an aqueous dispersion useful as an electrocoating composition. While the mixture was agitated, a titanium washer was employed as the anode in the electrocoating procedure of Example 1. A current of 80 milliamps was employed over a period of about 45 seconds. An electrodeposition of the polyamide acid dispersions was effected onto the titanium substrate which was initially dried at 100° C for 1 minute and then cured at 250° C for 2 ½ minutes. The cured film had a thickness of about 0.25 mil. It was found to impart valuable lubricity characteristics to the titanium washer when tested in accordance with the procedure of Example 1.

A load of from 55–138/psi was employed over a test time of from 30 to 120 minutes.

EXAMPLE 4

An aqueous dispersion of 0.1 part of the polyamide acid of Example 1, 0.14 part of phenol, 4.8 parts of water, 5 parts of diethylene glycol and 1.3 parts of aqueous collodial silica having about 25% solids was electrocoated employing aluminum electrodes. A constant potential over a range of from 25 to 100 Volts DC at 0.5 to 6 seconds was employed.

A cure of the electrodeposit was effected at 550F for 2 minutes. The films having a thickness of about 1 micron was found to have improved hardness and abrasion resistance as compared to a film cured in the same manner derived from an aqueous electrocoating mixture free of colloidal silica.

Although the above examples are limited to only a few of the very many polyamide acid mixtures which can be utilized in the practice of the invention, it should be understood that the dispersion employed in the present invention can include a much broader variety of polyamide acids, solvents, additives, etc. as shown by the descried procedure of these examples.

What we claim and desire to secure by Letters Patent of the United States is:

1. Substantially uniform polyamide acid solutions comprising by weight
   A. from 0.1 to 13% of polyamide acid
   B. at least .05% of finely divided molybdenum disulfide, and
   C. the balance solvent comprising water and phenol and containing sufficient tannic acid to disperse the molybdenum disulfide, and (A) is the product of reaction of at least one dianhydride selected from the class consisting of, benzophenone dianhydride, and a dianhydride selected from,

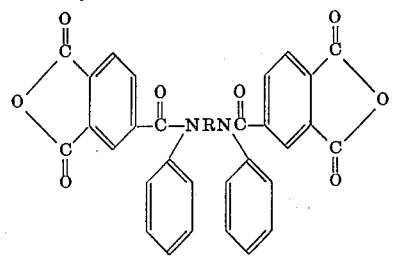

and

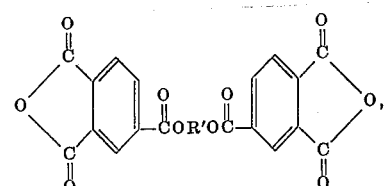

and at least one diamine selected from the class consisting of $C_{2-8}$ alkylene diamine, m-phenylene diamine and diamines having the formula,

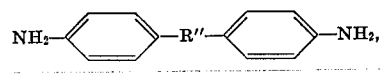

where R is a divalent hydrocarbon radical, R' is an alkylene radical, and R'' is selected from $C_{1-3}$ alkylene,

and -O-.

* * * * *